US011702548B2

United States Patent
Fuhse et al.

(10) Patent No.: US 11,702,548 B2
(45) Date of Patent: Jul. 18, 2023

(54) METHOD FOR PRODUCING PIGMENT FRAGMENTS WITH A PREDEFINED INTERNAL AND/OR EXTERNAL CONTOUR, AND PIGMENT FRAGMENTS

(71) Applicant: GIESECKE+DEVRIENT CURRENCY TECHNOLOGY GMBH, Munich (DE)

(72) Inventors: Christian Fuhse, Otterfing (DE); Manfred Heim, Bad Tölz (DE); Patrick Renner, Reichersbeuern (DE); Michael Rahm, Bad Tölz (DE); Thomas Mang, Holzkirchen (DE); Christoph Mengel, Holzkirchen (DE); Peter Schiffmann, Munich (DE); Maik Rudolf Johann Scherer, Grainau (DE); Christoph Hunger, Hausham (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 469 days.

(21) Appl. No.: 16/648,895

(22) PCT Filed: Jun. 5, 2018

(86) PCT No.: PCT/EP2018/000289
§ 371 (c)(1),
(2) Date: Mar. 19, 2020

(87) PCT Pub. No.: WO2019/057321
PCT Pub. Date: Mar. 28, 2019

(65) Prior Publication Data
US 2020/0283636 A1      Sep. 10, 2020

(30) Foreign Application Priority Data
Sep. 21, 2017    (DE) ................. 10 2017 008 831.4

(51) Int. Cl.
*B32B 43/00*     (2006.01)
*C09C 3/04*      (2006.01)
(Continued)

(52) U.S. Cl.
CPC ................. *C09C 3/04* (2013.01); *B31F 1/07* (2013.01); *B32B 43/006* (2013.01);
(Continued)

(58) Field of Classification Search
CPC ........................... B32B 43/006; B32B 27/10
See application file for complete search history.

(56) References Cited

U.S. PATENT DOCUMENTS 6,410,130 B1   6/2002  Schuhmacher et al.
6,643,001 B1  11/2003  Faris
(Continued)

FOREIGN PATENT DOCUMENTS

CN    1900178 A     1/2007
CN  101452658 A     6/2009
(Continued)

OTHER PUBLICATIONS

German Search Report from German Application No. DE102017008831.4, dated Mar. 22, 2018.
(Continued)

*Primary Examiner* — Philip C Tucker
*Assistant Examiner* — Nickolas R Harm
(74) *Attorney, Agent, or Firm* — Workman Nydegger (57) ABSTRACT

A method for producing pigments having a specified contour, comprises the steps of creating a pigment layer on a starting substrate; detaching from the starting substrate; and structuring the pigment layer into a plurality of the pigments; characterized by bringing into contact the pigment layer with an intermediate substrate, wherein the pigment
(Continued)

layer adheres at least in sections to the intermediate substrate; and separating intermediate substrate and starting substrate.

15 Claims, 4 Drawing Sheets

(51) Int. Cl.
    *B42D 25/378*     (2014.01)
    *C09D 11/037*     (2014.01)
    *B31F 1/07*     (2006.01)
    *B42D 25/40*     (2014.01)
    *B42D 25/425*     (2014.01)
    *B42D 25/369*     (2014.01)
    *B42D 25/373*     (2014.01)
    *B44C 1/22*     (2006.01)
    *B44C 1/24*     (2006.01)
    *B32B 27/10*     (2006.01)

(52) U.S. Cl.
    CPC ........... *B42D 25/378* (2014.10); *B42D 25/40* (2014.10); *B42D 25/425* (2014.10); *C09D 11/037* (2013.01); *B31F 2201/00* (2013.01); *B32B 27/10* (2013.01); *B42D 25/369* (2014.10); *B42D 25/373* (2014.10); *B44C 1/227* (2013.01); *B44C 1/24* (2013.01); *Y10T 156/11* (2015.01)

(56) References Cited

U.S. PATENT DOCUMENTS

| | | | |
|---|---|---|---|
| 6,747,073 B1 | 6/2004 | Pfaff et al. | |
| 7,645,510 B2 | 1/2010 | Argoitia | |
| 10,239,279 B2* | 3/2019 | Koike | ............... B32B 27/42 |
| 2004/0091681 A1 | 5/2004 | Hoffmann | |
| 2004/0115279 A1* | 6/2004 | Hansford | ............. A61K 9/0097 |
| | | | 264/109 |
| 2005/0019575 A1 | 1/2005 | Jungnitz et al. | |
| 2006/0035080 A1 | 2/2006 | Argoitia | |
| 2008/0096366 A1* | 4/2008 | Aoki | ................... H01L 21/4846 |
| | | | 438/455 |
| 2009/0217842 A1* | 9/2009 | Argoitia | ................ C09C 1/0018 |
| | | | 106/400 |
| 2010/0193469 A1* | 8/2010 | Lee | ....................... B81C 1/0046 |
| | | | 216/49 |
| 2011/0159245 A1* | 6/2011 | Taniguchi | ................ H05K 3/20 |
| | | | 428/156 |
| 2013/0063826 A1 | 3/2013 | Hoffmuller et al. | |
| 2018/0117946 A1* | 5/2018 | Mengel | ................ B42D 25/324 |
| 2018/0141370 A1 | 5/2018 | Schinabeck et al. | |

FOREIGN PATENT DOCUMENTS

| | | |
|---|---|---|
| CN | 106609050 A | 5/2017 |
| DE | 19738369 A1 | 3/1999 |
| DE | 19901612 A1 | 7/2000 |
| DE | 102004032799 A1 | 2/2005 |
| DE | 102015006854 A1 | 12/2016 |
| EP | 0370701 A1 | 5/1990 |
| EP | 1741757 A1 | 1/2007 |
| EP | 1932679 A1 | 6/2008 |
| EP | 2062947 A1 | 5/2009 |
| EP | 2316892 A2 | 5/2011 |
| EP | 2402401 A1 | 1/2012 |
| WO | 02083430 A2 | 10/2002 |
| WO | 2005017048 A2 | 2/2005 |
| WO | 2009010377 A2 | 1/2009 |
| WO | 2011138039 A1 | 11/2011 |
| WO | 2014161667 A1 | 10/2014 |

OTHER PUBLICATIONS

International Search Report and Written Opinion from PCT Application No. PCT/EP2018/000289, dated Oct. 9, 2018.

* cited by examiner

METHOD FOR PRODUCING PIGMENT FRAGMENTS WITH A PREDEFINED INTERNAL AND/OR EXTERNAL CONTOUR, AND PIGMENT FRAGMENTS

BACKGROUND

The invention relates to a method for producing pigments having a specified contour as well as to corresponding pigments.

Data carriers such as value documents or identification documents, but also other objects of value, such as for example branded products, often are provided with effect pigments for their protection, which allow the data carrier to be authenticity-checked and which at the same time serve as a protection against unauthorized reproduction. Effect pigments can, for example, be integrated in the substrate of the data carrier or applied onto the substrate of the data carrier. Pigments with a specified outer contour are a known shape of such effect pigments.

Effect pigments can be produced, among other things, by coating a carrier material, the coating being subsequently detached from the carrier and ground into small fragments. These fragments can be dispersed as pigments in a binder and finally printed. Neither the shape of the pigments nor their size are precisely defined by the mode of production.

However, there are also known various methods for creating pigments having a specified outer contour.

For example, WO 2005/017048 A2 proposes embossing the carrier material according to the desired pigment contour and creating the coating on the embossed carrier material. The coating is taken off the carrier layer and broken into pigments that may have a diameter of 5 to 100 μm by grinding and sieving. Also, in EP 2 062 947 A1, which proposes an improved embossing structure to specify the contour of the pigments, the layer taken off is broken into pigments.

In alternative solutions, the pigment layers are structured into pigments by lasering or etching.

SUMMARY

The invention is based on the object of providing a flexible but cost-effective production method for pigments, which in particular allows to create pigments with more complex outer contours.

A method for producing pigments having a specified contour comprises the following steps:
creating a pigment layer on a starting substrate;
detaching from the starting substrate; and
structuring the pigment layer into a plurality of the pigments.

In the present case, the pigment layer is brought into contact with an intermediate substrate. The pigment layer adheres at least in sections to the intermediate substrate. The intermediate substrate and the starting substrate are then separated.

In particular, the specified contour of the pigment may here include an outer contour (outline of the pigment). The outer contour of the pigment limits the pigment. Likewise, the specified contour of the pigment may have an internal contour. The internal contour of the pigment limits an opening in the pigment. The method makes it possible to supply pigments with more complex outer contours than the conventional breaking of the pigment layer does. In addition, for the first time pigments having an internal contour, i.e. with a circumferential breaking edge that limits an opening within the pigment, can be produced by breaking.

By the contact with the intermediate substrate, the pigments (or pigment sections of the pigment layer) are protected against breakage for the steps of detaching and/or structuring.

Preferably, the pigment layer is structured into the plurality of the pigments by the step of separating the intermediate substrate and the starting substrate. Upon separation, the pigment layer breaks into the plurality of the pigments having a specified contour.

With the present method, in the step of separating at least 2000 pigments, particularly preferably at least 5000 pigments and more preferably more than 10000 pigments are simultaneously structured (or broken out) from the pigment layer. This number is preferably structured simultaneously respectively along a separating line.

In particular, the pigment layer comprises pigment sections and residual sections. The pigment sections have the contour of the pigments. The pigment sections are spaced apart from each other, in particular by the residual section. The residual sections have a contour inverse to the pigment sections. Optionally, the residual sections can be connected to each other. In the step of separating, the pigment layer breaks and either the pigment layer sections, or the residual sections are detached from the starting substrate. The respectively other sections—i.e. the residual sections or the pigment layer sections, respectively—still lie on the starting substrate after separation.

By the present method pigments can be produced with the specified contour in high purity. The degree of purity can be indicated in weight percent. The pigments having specified contour form more than 90%, preferably more than 95%, of the mass by weight comprising the pigments and impurities which are formed in particular by fragments of the pigment layer and only insignificantly by pigments with damaged contour. In particular, impurities by fragments are avoided, because the residual sections of the pigment layer (or the pigment sections) remain adhered to the starting substrate.

In the preferred configuration, the pigments (or the pigment layer sections of the pigment layer) are detached by the step of separating from the starting substrate. The pigments are transferred from the starting substrate to the intermediate substrate and at the time of breaking they are protected by the intermediate substrate. The pigments are then detached from the intermediate substrate.

In another configuration, after separation the plurality of the pigments (or the pigment layer sections of the pigment layer) is still present on the starting substrate. The pigments are then detached from the starting substrate. In the step of separation, the pigment layer breaks, and the residual sections are detached from the starting substrate.

Merely as an alternative to the above-mentioned configurations, the pigment layer is structured already before the step of separation. In the step of separation, from the already structured pigment layer there are detached either the pigment layer sections or the residual sections from the starting substrate. At the time of detachment, the pigments are protected by the intermediate substrate (and the starting substrate).

In the starting substrate and/or the intermediate substrate, a relief structure is created which specifies the contour of the pigments. The relief structure comprises in particular raised sections in which the pigment layer comes into contact with and adheres to an adhesive layer (of the respective other substrate), and recessed sections in which contact of the pigment layer with this adhesive layer is avoided. Either the recessions or the rises are provided with the contour of the pigments. The relief structure can be created by embossing, lasering or etching. Since the relief structure (and/or an adhesion structure explained below) does not yet lead to single pigments, in the present case this is also referred to as pre-structuring. The height of the relief structure is preferably greater than the height of the pigment layer. In particular, the relief structure in its height (difference between the plane rises and recessions) is adapted to the height of the pigment layer and/or the adhesive layer, in particular to the height and viscosity thereof. The adaptation causes the pigment layer to selectively adhere to the intermediate substrate (or adhere more strongly than to the starting substrate) only in the raised sections. The structuring of the pigment layer into single pigments is effected by breaking the pigment layer having the contours which are specified for the pigments and defined by the pre-structuring.

The starting substrate can be provided with the relief structure preferably before, but alternatively also after the creation of the pigment layer on the starting substrate. The relief structure can in particular be created by embossing, preferably by embossing into a curable (lacquer) layer which is cured after embossing, for example by means of UV light. In the starting substrate without pigment layer, the relief structure can alternatively be created also by etching or lasering. According to the relief structure, the pigment layer comprises pigment sections and residual sections on the pre-structured starting substrate. After bringing them into contact with the intermediate substrate, the raised sections adhere to the adhesive layer of the intermediate substrate. Preferably, the pigment sections are the raised sections which—are stabilized by adhesion to the intermediate substrate and—upon separation of the substrates break out of the pigment layer, remain adhered to the intermediate substrate and detach from the starting substrate.

If the intermediate substrate is provided with the relief structure, raised or recessed sections of the adhesive layer of the intermediate substrate arise. In a first alternative, the intermediate substrate is provided with the relief structure and subsequently coated with the adhesive layer. The relief structure is preferably embossed, in particular embossed into an embossing lacquer layer of the intermediate substrate. In a second alternative, the intermediate substrate is pre-structured together with the adhesive layer, i.e. for example embossed. Again, either the pigment sections or the residual sections detach from the starting substrate because they remain adhered to the adhesive layer of the intermediate substrate.

Instead of—or optionally in addition to—the relief structure, an adhesive structure may serve as a pre-structuring. On the pigment layer, the starting substrate and/or the intermediate substrate, a relief structure is created which specifies the contour of the pigments. As such a pre-structuring my serve either an adhesion-promoting adhesive structure or an adhesion-preventing anti-adhesive structure. For example, the adhesive layer of the starting substrate could be pre-structured, in particular by selectively removing or deactivating by means of laser or by selective anti-adhesion printing. In accordance with the pre-structuring, again preferably the pigments, i.e. the pigment sections of the pigment layer, remain adhered to the intermediate substrate and detach from the starting substrate.

The intermediate substrate comprises at least one intermediate substrate layer. Normally, the intermediate substrate comprises the intermediate substrate layer and an adhesive layer. The adhesive layer of the intermediate substrate is configured such that the pigment layer adheres more strongly to the adhesive layer of the intermediate substrate than to the starting substrate (or its adhesive or anti-adhesive layer). The starting substrate comprises at least one starting substrate layer. Normally, the starting substrate comprises the starting substrate layer and an adhesive or anti-adhesive layer. The adhesive layer of the starting substrate can be formed by a lacquer. The starting substrate layer preferably comprises a foil—in particular a plastic foil, such as PET foil—as well as a cured embossing lacquer layer. The starting substrate layer and/or the intermediate substrate layer is preferably present as a (foil) web with a minimum width of 20 cm, in particular 50 cm and particularly preferably 100 cm. The foil web may have a width of 200 cm. The web has a minimum length of 10 meters, preferably 100 meters. It can be supplied on a roll.

The pigment layer may comprise several partial layers which in turn may optionally be formed from partial layers. The pigment layer preferably comprises a first layer of increased stability (carrier layer) and at least one second optically effective layer. The first layer can be formed in particular by a cured lacquer.

The pigment may include an additional motif which is preferably arranged in exact register to the contour of the pigment and/or has a contour independent of the pigment contour. The exactly registered arrangement can be achieved in particular without additional effort, when the additional motif is at least partially co-created in the step of creating the relief structure. For example, with embossing the starting substrate, both the relief and an optically effective relief structure of the additional motif can be incorporated. A contour of the additional motif may follow the (outer or internal) contour of the pigment at a firm distance. The pigment sections of the pigment layer and thus the surface of the pigment can be completely flat, i.e. free of reliefs. Alternatively, they can have—at least in some regions—a surface structure. The additional motif can be formed by the surface structure. The surface structure possesses a lower depth modulation, for example from 3 nm to approx. 500 nm, than the contour-determining portion of the relief structure. The additional motif may have subwavelength structures, such as moth eye structures, and/or diffractive structures, such as holographic gratings, the latter having typical periods between 500 nm and 1.5 µm. In particular, the additional motif may include micro-mirrors. These may be determined in their shape by the embossing and coated reflectively (metal or HRI layer). Alternatively, the contour of the additional motif is independent of the contour of the pigment, can therefore be freely selected. For example, a continuous partial layer of the pigment layer can be created which breaks along the pigment contour, and an additional, non-continuous partial layer of the pigment layer can be created which for example represents the additional motif.

The pigments which have arisen from the pigment layer can be referred to as areal pigments or platelike pigments. The outer contour may have almost any arbitrary shapes subject to the pigment having a sufficient stability for the further processing. Also, the internal contour, i.e. openings, can be selected with any arbitrary size and geometry.

Of course, (the) pigments are provided for printing the pigments. The pigments, in particular those detached from the starting and/or the intermediate substrate, are processed into a printing ink. A printing ink having the pigments is printed. Preferably, the printing is effected by screen printing, in particular by means of zonal doctoring. Alternatively, the pigment can be printed by means of gravure printing and optionally by flexographic printing. The printing ink comprises the pigments and at least one solvent and optionally a binder. If the generated pigments have in particular a pigment size of less than 15 µm, preferably less than 10 µm, the printing ink can be used in an offset printing method.

In comparison to other production methods, in the present case there can be achieved pigments having increased complexity even at a smaller size and thickness, in particular with consistently high reliability. The pigment has a size or lateral extent of less than 100 µm, in particular less than 50 µm, preferably less than 30 µm. The currently achievable pigment sizes start at a few 100 nm. It is forseeable that pigments having sizes between 100 nm to 100 µm, preferably between 200 nm and 50 µm, particularly preferably between 200 nm (or 2 µm) and 30 µm, are possible. The thickness of the pigments is in the region of 30 nm to 4 µm (or up to 2 µm), preferably between 100 nm and 1 µm.

The outer contour of the pigment has deviations from a regular outer contour. Regular outer contours are considered to be all basic shapes from the simple polygon (having 3 to n corners) including a circle. Bulges or indentations which deviate from the regular basic shape have the following typical sizes: 100 nm to 30 µm, preferably 300 nm to 10 µm and particularly preferably 500 nm to 5 µm. Deviations from a regular outer contour form weak spots in the pigment. The pigment will thus break faster—without application of the present method—at its weak spot within the pigment than at its outer contour. In relation to the pigment size, the maximum size of the pigment in one direction, the at least one indentation reduces the pigment at a weak spot to 5% to 66%, or 5% to 49% of the pigment size. The pigment thus has at its narrowest spot only 5% to 66%, preferably 5% to 49%, particularly preferably between 5 and 24% of the pigment size. Analogously, bulges related to the pigment size form accordingly narrow spots (weak spots) in the pigment. Bulges (and/or indentations) form a narrow spot in the pigment which lies at a distance of more than 3%, preferably more than 6%, particularly preferably more than 12% of the pigment size from the outer contour. Accordingly, the minimum length of the bulge (measured from the pigment center or center of gravity to the outer contour) is 3% (6% or 12%) of the pigment size. The bulge at the narrow spot has a width of only 1% to 33%, preferably 1% to 15%, particularly preferably 1% to 5% of the pigment size. The bulge has at the narrow spot an opening angle, formed by the edges of the bulge, of less than 60 degrees, preferably less than 45 degrees, particularly preferably less than 30 degrees. The opening angle at the narrow spot can be zero, for example in the case of a rectangular bulge (with parallel edges), or negative, for example in the case of a bulge widening outwards.

A specified internal contour (opening in the pigment) of the pigment may represent the specified contour or complement the specified outer contour of the pigment. The opening can be designed as a regular polygon (triangle, square, . . . n-corner), circle, oval, irregular polygon (such as trapezoid), symbol (with corners and curves) or text. Preferably, the opening follows the outer contour (partially or completely) and/or the opening follows an additional information on the pigment.

The internal contour has a size of at least 100 nm. Between the internal contour and the outer contour, the pigment has a minimum width of 300 nm, in particular 500 nm or 1 µm, in particular a width of 300 nm to 10 µm, particularly preferably 500 nm to 5 µm. In relation to the pigment size, the pigment has at its narrowest spot between outer contour and internal contour a width of less than 66%, preferably less than 30%, particularly preferably below 10%, of the pigment size.

Normally, pigments with identical contours are produced. In an advantageous configuration, from one pigment layer there are simultaneously produced pigments with two (or three or more than three) different specified contours. In further developments, the simultaneously produced pigments comprise (at least) one uniform, specified outer contour and at least two different internal contours for the uniform, specified outer contour or (at least) one uniform, specified internal contour and several different outer contours for the uniform, specified internal contour. For example, the uniform outer contour may represent a first (supra) national symbol and the internal contour may represent regional (or accordingly national) symbols.

As an optical effect layer of the pigment, a metal layer can be used, for example from aluminium, chrome, copper, iron, nickel, cobalt, silver, gold or from alloys of the aforementioned metals. The thickness of the metal layer is between 2 nm and 200 nm, preferably between 10 nm and 50 nm, particularly preferably between 15 nm and 30 nm. The optical effect layer can be configured as a reflective or semitransparent layer, here instead of a metal layer a high-refractive layer (HRI layer) can be used. The pigment comprises preferably three-layer construction which may be designed as a color-shifting and/or color-filtering construction. The pigment can be formed by the three-layer construction or comprise the three-layer construction as a supporting partial layer or as an optically active partial layer. The three-layer constructions preferably consist of a semi-transparent metal layer, a dielectric and a reflective (or semitransparent) metal layer. As dielectrics for example $SiO_2$, ZnS, $MgF_2$ or $TiO_2$ are used.

Particularly preferably, at least the optically active partial layers of the pigment are provided to be symmetric to the pigment plane. Thus, an orientation of the pigment after the printing process is irrelevant. For example, the pigment can be formed by two identical semi-transparent partial layers with a supporting spacer layer. Such pigments have, preferably in a top view, a metallic gloss with a certain color spectrum, while in transmission they show a spectrum complementary to this color spectrum, particularly preferably gold in top view and blue in transmission. In another variant, a dielectric and a semitransparent layer are provided respectively symmetrically around a shared reflective layer (above and below).

For the pigments in their orientation being influenceable by a magnetic field, a magnetic layer can be used which can be formed for example from the metals iron, nickel, cobalt or alloys which include these metals. Such alloys preferably include further elements such as Si, Nd, B, Gd, Sm, Sr, Ba or Mn. The magnetic layer is advantageously located in the interior the pigments. In a particularly advantageous variant, the magnetic partial layer is provided between two reflective partial layers, for example made of aluminium. The pigments particularly preferably have a central magnetic layer which is provided on both sides (symmetrically) with a three-layer construction, i.e. in particular on both sides in each case—from the inside to the outside—comprises a reflecting layer (preferably a reflecting metallic layer), a spacer layer (preferably a dielectric layer) and an absorber layer (preferably a semitransparent metallic layer).

With the present method, for the first time there can be produced pigments having
- a breaking edge limiting the pigment, which represents a breaking force which is greater than a corresponding breaking force for the pigment, and/or
- an inner breaking edge, which limits an opening in the pigment.

The breaking force of the pigment is determined by its narrowest spot. The pigment can thus more easily have in its outer contour at least an acute angle with an angle smaller than 45 degrees, preferably smaller than 30 degrees, or an outer contour tapering towards the pigment center. Such outer contours have been problematic up to now and conceivable only with greatly increased effort, such as in comparison to the thickness of the pigment layer very thin predetermined breaking points. The breaking force of the pigment is in the present case smaller, at least by a factor of 1.1, preferably 1.5, preferably by a factor of 2 than the breaking force of the breaking edge. The breaking force of the breaking edge can be determined (calculation) starting out from a breaking force of the pigment layer (measured value) based on the breaking edge (surface) area and the contour. A breaking force is determined or measured as the maximum applicable force until the object to be measured breaks. In the present case, the pigment is loaded preferably at two points which are at a specified distance from a resting point or resting line of the pigment. At least approximately, the ratio of the breaking forces corresponds to the ratio of the breaking regions. The pigment cross-sectional area at the narrowest spot of the pigment, i.e. in particular the width of the weak spot of the pigment multiplied by the height of the pigment layer, may in the present case be smaller than the surface area of the breaking edge of the pigment at its outer contour, i.e. in particular the length of the breaking edge multiplied by the height of the breaking edge.

The inner breaking edge forms the internal contour of the pigment. The breaking edge limiting the pigment forms the outer contour of the pigment.

BRIEF DESCRIPTION OF THE DRAWINGS

Further embodiment examples as well as advantages of the invention will be explained hereinafter with reference to the figures, in whose representation a rendition that is true to scale and to proportion has been dispensed with in order to increase the clearness.

There are shown.

DETAILED DESCRIPTION OF VARIOUS EMBODIMENTS

Figure 1A:
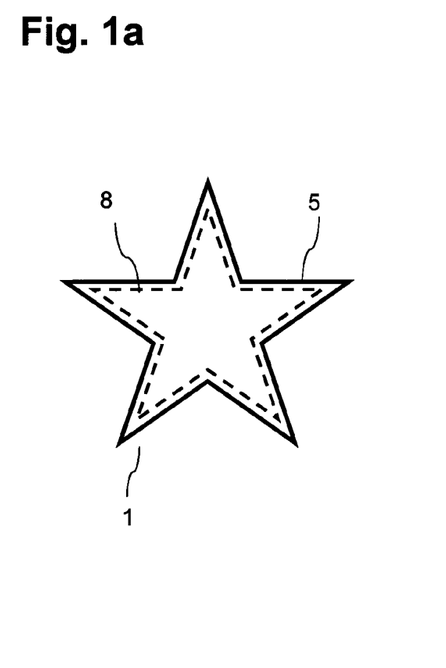
FIG. 1a, 1b two different pigments with specified contour in top view.
Figure 1B:
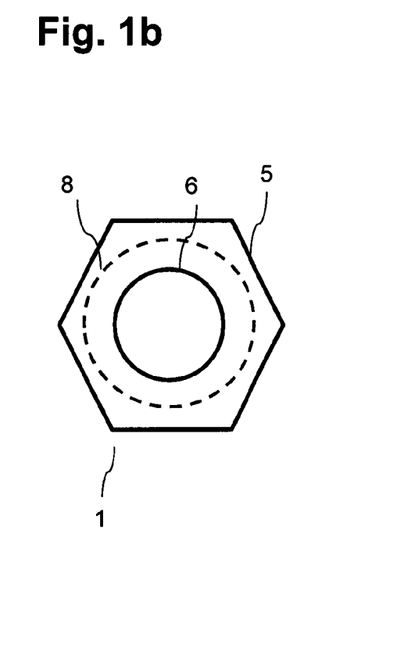

The pigments 1 shown in FIGS. 1a and 1b have different outer contours 5. The Pigment 1 in FIG. 1b additionally comprises an internal contour 6 which limits an opening in pigment 1. The contour 5, 6 cannot be recognized by the viewer without aids due to the pigment size which is in the region from 100 nm to 100 µm. In this respect, the pigment can be used as a hidden security feature.

Both pigments comprise an additional motif 8, which is arranged in exact register to a contour of the pigment. The contour of the additional motif 8 in FIG. 1a follows the outer contour 5 of the pigment at a specified distance. In FIG. 1b, the (here round) contour of the additional motif follows the (round) internal contour 6 of pigment 1. However, the additional motif may also have its own contour independent of the pigment contour.

Figure 2A:
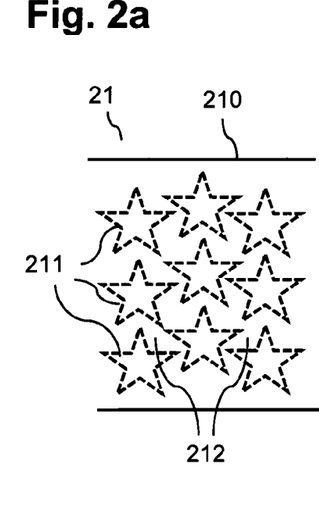
FIG. 2a, b, c pigment layer, structured pigments and loose pigments each in top view.

FIG. 2a shows a top view of a starting substrate with pigment layer 21. A continuous pigment layer 210 has been created on a pre-structured starting substrate. In accordance with the pre-structuring, the pigment layer 210 comprises a plurality of pigment sections 211 and the residual sections 212 located between the pigment sections.

Figure 3:
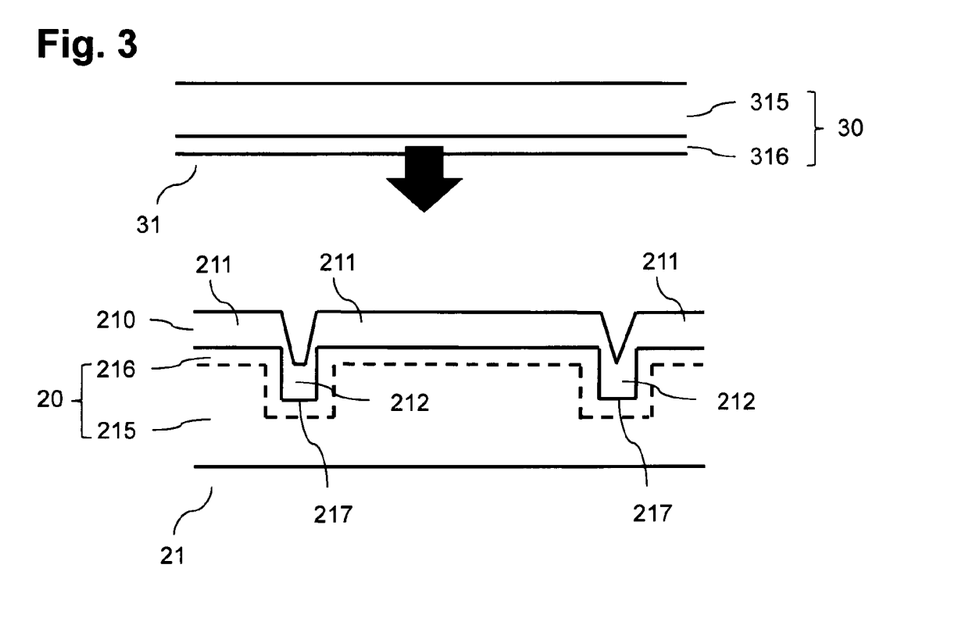
FIG. 3 a relief-structured starting substrate with pigment layer prior to being brought into contact with an intermediate carrier substrate.

In the configuration shown in cross-section in FIG. 3, the starting substrate 20 is provided with a relief as a pre-structuring. The relief structure is formed by recessed sections 217. The starting substrate 20 comprises at least one starting substrate layer 215, in particular in the form of a PET foil, and an optional embossing lacquer layer 216. In a variant that is not represented but is preferred, the relief structure is executed only in the embossing lacquer layer 216. The pigment layer 210 created on the starting substrate is a continuous layer. In less advantageous configurations, the pigment layer is created to be already structured, for example by recessions that are accordingly wide and/or deep. Corresponding to the relief structure, pigment sections 211 and residual sections 212 of the pigment layer form. The pigment sections 211 lie on the raised sections of the relief structure and the residual sections 212 in the recesses 217. As can be recognized in FIG. 2a, the pigment sections 211 are already pre-structured according to the contour of the pigments 1. The residual sections 212 located between the pigment sections 211 have a contour inverse to the pigments.

Also shown in FIG. 3 is an intermediate substrate 30 which comprises an intermediate substrate layer 315, for example a further PET foil, and an unstructured adhesive layer 316. As indicated by the arrow, the intermediate substrate layer 30 is brought into contact with the pigment layer 210. In this step, pressure can be exerted and the temperature can be increased. The pigment layer 210 adheres, due to the relief structure, with its pigment sections 211 to the adhesive layer 316 of the intermediate substrate. The residual sections 212 do not come into contact with the adhesive layer 316 at all or at least not sufficiently enough to adhere thereto.

Figure 4:
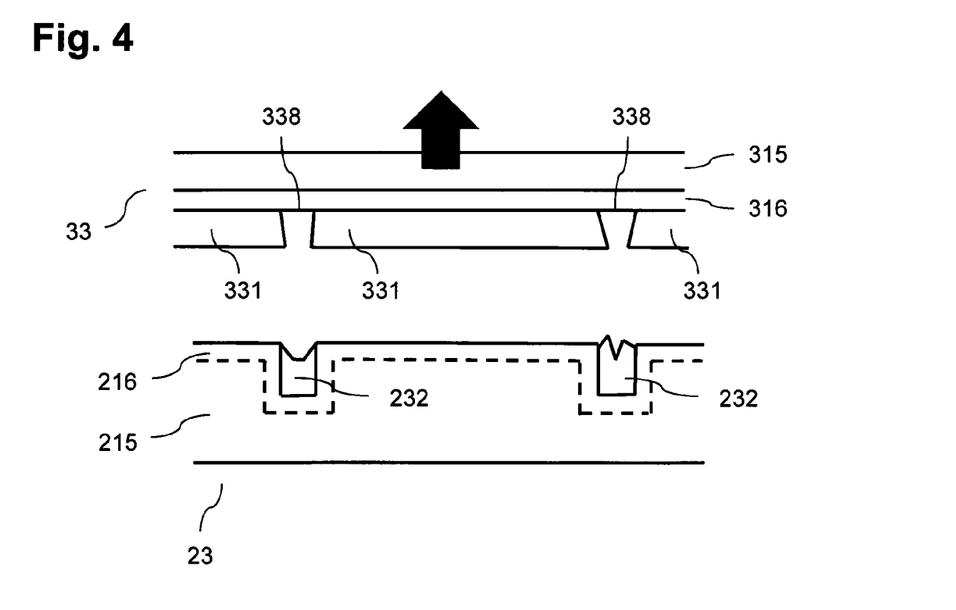
FIG. 4 the starting substrate and the intermediate carrier substrate of FIG. 3 after separation of the substrates.

The starting substrate and the intermediate carrier substrate are again separated from each other, as indicated in FIG. 4, again by an arrow. FIG. 4 shows the starting substrate including residues of the pigment layer 23 and the intermediate substrate including pigment sections 33 already in the separated state.

Figure 2B:
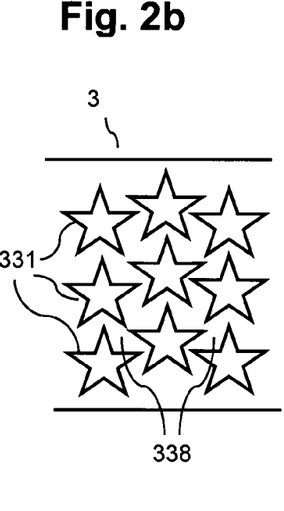

When the two substrates are separated, the pigment layer breaks. It is structured into the individual pigments, which are present as pigment sections 331. The pigment sections 331 adhere to the adhesive layer 316 of the intermediate substrate. Between the pigment sections 331, there are free intermediate substrate surfaces 338 on the intermediate substrate 33—as can be seen in FIG. 2b in top view. After separation, the residual sections 232 of the pigment layer are still present on the starting substrate 215, 216.

Figure 2C:
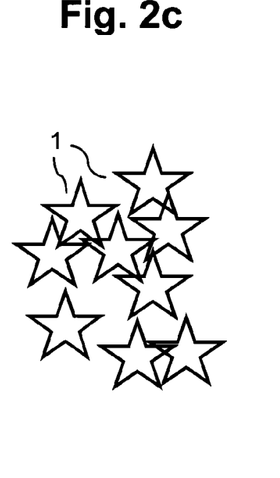

As indicated in FIG. 2c, the pigment sections 331 are then detached from the intermediate substrate and are then present as a plurality of pigments 1. The pigments 1 are further processed into a printing ink.

At the time of structuring the pigment layer into pigment sections—by breaking and detaching the pigment sections from the starting substrate—the pigment sections are protected against breakage by the intermediate substrate. The pigment sections are not exposed to any unnecessary force and can thus be designed substantially thinner or more filigree than conventional ones.

Figure 8:
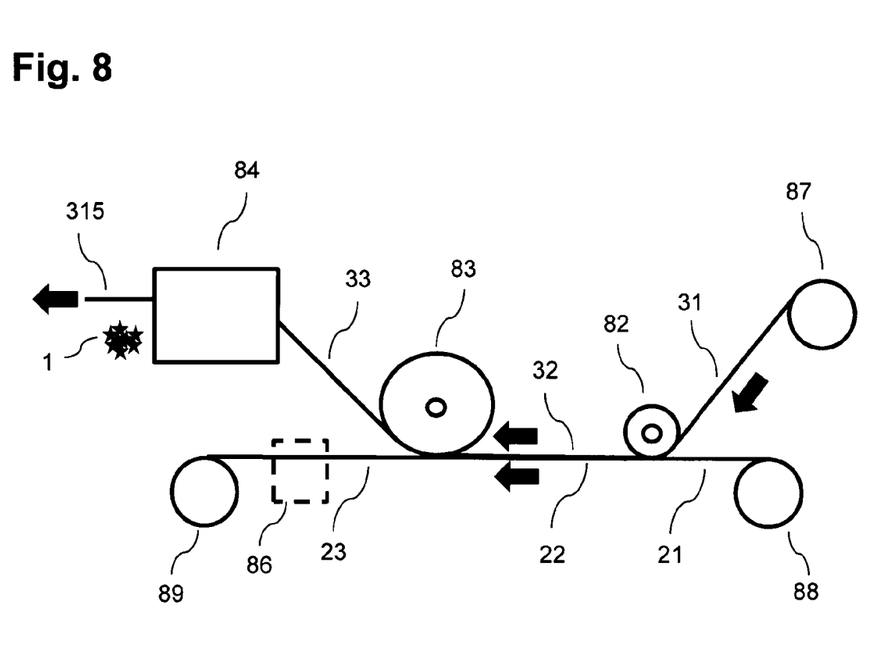
FIG. 8 a production device for pigments.

FIG. 8 shows a device for producing pigments 1 starting out from a starting substrate having pigment layer.

From a first starting substrate layer roll 88, the starting substrate having pigment layer 21 is unwound. From an intermediate substrate roll 87, an intermediate substrate 31 is unwound. The unwound intermediate substrate 31 is preferably provided with an adhesive layer, for example printed or sprayed. The substrates are brought into contact with each other, for example with the aid of a contact roller 82. The pigment layer of the starting substrate 22 adheres to the adhesive layer of the intermediate substrate 32. The substrates are separated at a separating roller 83, for example. The intermediate carrier web having pigment sections 33 is guided to a detachment unit 84. In the detachment unit 84, the pigments 1 are detached from the intermediate carrier web 315, for example by dissolving the adhesive layer 316 of the intermediate carrier web.

The plurality of the pigments 1 can now be further processed into printing ink. The starting substrate having pigment layer residues 23 can be freed from the pigment layer residues in an optional further detachment unit 86 and rewound on a second starting substrate roll 89. The detachment unit 86 can dissolve the pigment layer residues 23 on the starting substrate (e.g. detach them by chemically decomposing and/or mechanically crushing). The starting substrate and/or the intermediate substrate can be reused for the production of further pigments.

The device shown (with a separating roller) enables a continuous structuring, in particular a continuously effected breaking of the pigments out of the pigment layer. Other variants are conceivable, for example with a stamp, which execute the (contacting and) separating of the substrates one after the other for independent substrates—rather as shown in FIG. 3—or respectively for sections of a substrate web one after the other.

The present method can be divided into several substeps.

Step 1 (optional): Coating a starting substrate layer or a carrier material, e.g. a PET foil, with an embossing lacquer.

The embossing lacquer layer is preferably a lacquer with low adhesion to the pigment layer. In particular, the embossing lacquer can be selected such that a (PVD) layer can be vapor-deposited thereon in a separable (or mechanically detachable) manner. The embossing lacquer can be a UV-curable lacquer or a thermoplastic embossing lacquer.

Step 2: Pre-structuring the starting substrate layer, in particular with a relief structure.

The relief structure is incorporated into the embossing lacquer by embossing (roll-to-roll) binary structures which correspond to the outline of the effect pigments. Depending on the embossing lacquer used, the embossing is effected under the influence of UV radiation or heat in order to generate and fix the structures in the lacquer. The depth of the embossed structure depends on the thickness of the effect pigments: for thin pigments (e.g. 300 nm) a depth of approx. 1 μm or more is sufficient. Thicker pigments require deeper embossed structures. The flanks of the binary embossed structure are sufficiently steep so that the pigment layers can be broken there later.

If the pigments are to have not only their contour but also additional information later on, these can be embossed on the raised and/or recessed regions of the binary embossing as a surface modulation. This is preferably done during the same embossing step, i.e. the embossing tool contains the deep binary structure for defining the pigment outlines and at the same time the flatter surface structure for achieving additional, for example optical effects in the pigments. This procedure has the great advantage that the surface modulations effecting the optical effects are perfectly registered to the contour of the effect pigments. For example, in this way diffractive letterings can be placed exactly in the center of pigments.

As an alternative to embossed lacquer, a release lacquer of suitable thickness which is applied in structured manner, for example printed, can also be used. A disadvantage of this variant, however, would be that with a printing method there can be achieved only lower resolutions than with an embossing method.

Step 3 (optional): If no lacquer was used in step 1, on which the PVD layer deposited subsequently adheres only weakly anyway, as a third step there is required a measure which leads to the fact that no strong adhesion between the embossing lacquer and the coating deposited in the next step comes about. For example, an anti-adhesive layer can be applied.

Step 4: Creating of the pigment layer on the embossed structure, including all partial layers of the pigment layer.

The pigment layers are, in particular, vapor-deposited, e.g. by means of PVD coating of the embossed structure. In doing so, the previously described partial layers or sublayers of the partial layers are applied. It is important that the layers remain detachable from the embossed structure. Suitable methods are, for example, PVD methods, of which thermal vapour deposition is particularly preferred, as due to the directed particle flow it leads to a lower coating of the vertical walls between the raised and recessed regions of the binary embossing. This facilitates the separation of the coating later upon separating the substrates.

Alternatively, a partial layer, in particular a metallic layer, could also be applied by gravure or flexographic printing method. Because of the necessary predetermined breaking point, solvents or water-based inks having metal flakes are preferably utilized, which preferably have a thickness of less than 200 nm, especially less than 150 nm.

Step 5: Supplying a foil which is coated with tacky and possibly deformable lacquer as an intermediate substrate.

Step 6: Bringing the pigment layer into contact with the intermediate substrate. The intermediate substrate is laminated with the embossed and coated first foil, the starting substrate, under the influence of pressure and, where applicable, at an increased temperature. The components of the coating which are located on the raised regions of the binary embossed structure, bond firmly with the tacky lacquer. A possibly present surface modulation, for example a holographic grating, will be embossed into the tacky lacquer. The pigment layer in the recesses of the embossed structure preferably does not touch the adhesive layer.

Step 7: Upon separating or separatingly winding the two foils, the sections of the coating detachably connected to the raised regions of the binary embossing are transferred to the tacky lacquer of the second foil—the intermediate substrate. However, those sections of the coating which are located in the recesses of the binary embossing remain on the first foil—the starting substrate.

Step 8: Finally, the pigments, which are well defined in their outline form, are detached from the respective carrier foil, for example by partially dissolving or dissolving the lacquer supporting them in a suitable solvent. The pigments being in detachment are subsequently further processed by suitable steps. Attention has to be paid that they do not clump together.

Processed as pigments are the detached sections of the pigment layer transferred onto the intermediate substrate, the second foil.

The starting substrate, the first foil, with the remaining pigment layer sections could be disposed of. As an alternative to disposal, also the coating components remaining on the first foil could be further processed into pigments (without specified contour or with negative contour). It is therefore also possible to process both the pigment layer sections on the first and the second foil into different pigments.

However, the starting substrate can also be reused for the present method, optionally after the residual sections have been detached from the starting substrate. On the starting substrate having relief structure, the first foil, a pigment layer can be created (structured and . . . ) several times in a row. Thus, material costs and process steps can be saved, because the embossing lacquer and the embossing do not always have to be executed anew. A UV-curable material is preferably used as an embossing lacquer, into which the structures are permanently embossed. In particular, it can thus be achieved that the increased temperature in the laminating step does not affect the relief structure.

In the configurations hitherto described, the starting substrate was provided with a relief structure in which the pigment sections with the specified contour form on the rises. Alternatively, the relief can also be designed inversely. It may comprise areal recessions having the specified contour for the pigment sections and rises for the residual sections. When separated the residual sections detach from the starting substrate and adhere to the intermediate substrate. The pigment sections (in the recesses) remain on the starting substrate and are detached from the starting substrate only after the separation of the substrates. Ultimately, in a less advantageous configuration it is even conceivable to provide the intermediate substrate layer with the relief structure, so that the (non-pre-structured) pigment layer remains adherent to the adhesive layer of the intermediate substrate in the region of the rises of the relief. The rises may here alternatively correspond either to the pigment sections having the specified contour or to the residual sections.

The pigment sections 331 arranged on the intermediate substrate 33 in FIG. 4 (or alternatively the pigment sections arranged on rises of the intermediate substrate) may optionally be provided with a further partial layer. The further partial layer may be supplied all-over and advantageously applied only onto the pigment sections 331 by means of a contact printing method (kiss print). To the free sections 338 of the adhesive layer the partial layer is not transferred, since only the pigment sections 331 come into contact with the partial layer. The contact printing method here uses implicitly the existing differences in height of the pigment sections on the substrate as a printing master. The pigment sections including their further (backside) partial layer are detached from the intermediate substrate.

Basically, also partial layers of the pigment layer could be created using a contact printing method. For example, a further pigment partial layer can be printed onto, for example vapor-deposited, existing pigment partial layers that are present on the starting substrate having a relief structure. The further partial layer (supplied over the full area) here is applied analogously only onto the raised sections of the pigment layer.

Figure 5:
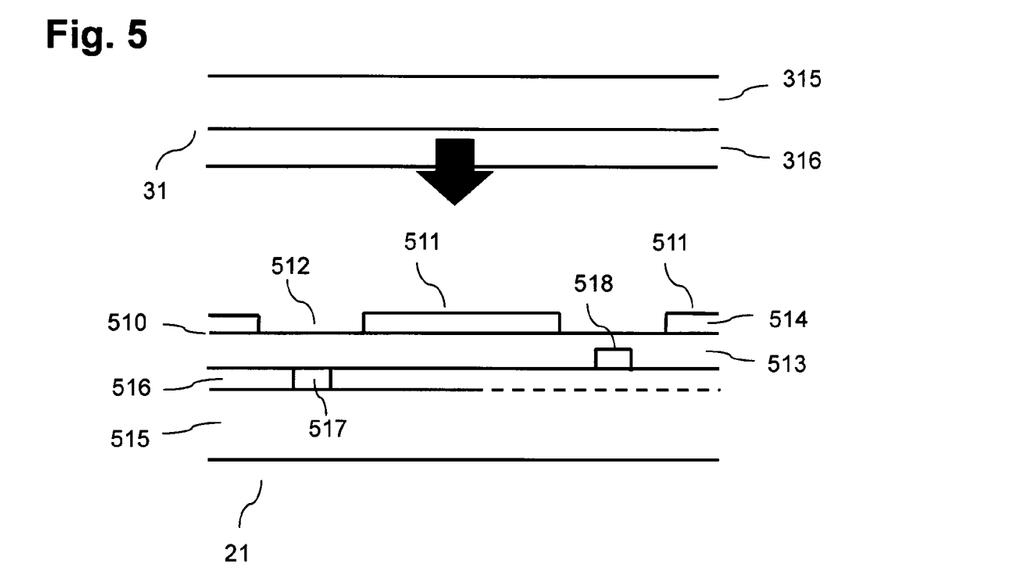
FIG. 5 an adhesion-structured starting substrate with pigment layer prior to being brought into contact with an intermediate carrier substrate.
Figure 6:
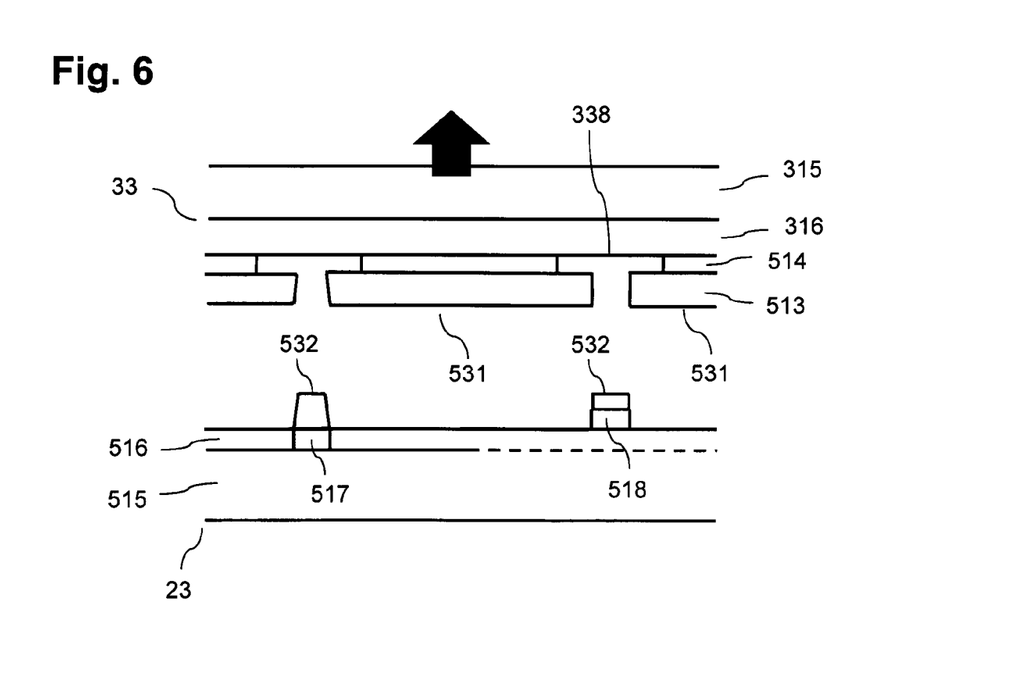
FIG. 6 the starting substrate and the intermediate carrier substrate of FIG. 5 after separation of the substrates.

In the configuration according to FIGS. 3 and 4, the pigment layer is pre-structured by a relief structure in order to specify the contour of the pigment. FIGS. 5 and 6 show alternative configurations in which an adhesion-determining layer is structured in order to define the contour.

The starting substrate having pigment layer 21 in FIG. 5 comprises a substrate layer 516, 517, 518 and a pigment layer 510 which for its part contains two partial layers 513, 514. On the PET foil 515 a structured adhesion-determining layer is provided which can be configured as a continuous anti-adhesive layer 516 with adhesive layer sections 517 or as an adhesive layer 518 arranged on the substrate layer 515 (or the anti-adhesive layer 516). The pigment layer 510 comprises the continuous pigment partial layer 513 and a non-continuous (but already structured) pigment partial layer 514. Pigment sections 511 of the pigment layer and residual sections 512 are specified by the adhesion structure 517, 518.

The starting substrate 21 is brought into contact with the adhesive layer 316 on the intermediate substrate, as symbolically shown by the arrow in FIG. 5. Here, the adhesive layer 316 can also come into contact with the residual sections 512, i.e. not only the pigment sections. The adhesive layer 316 and the adhesive structure 517, 518 are coordinated to each other such that the pigment layer adheres more strongly to the adhesive structure 517, 518. The pigment layer in turn is structured into the pigments (pigment sections) when the substrates are separated.

FIG. 6 shows the starting substrate having pigment layer residues 23 and the intermediate substrate including pigment sections 33 after separating the substrates. Residual sections 532 of the pigment layer remain adhered to the adhesive structure 517, 518. The pigment sections 531 remain adherent to the intermediate substrate, i.e. upon separation they have detached from the starting substrate or its anti-adhesive layer 516. Free sections 338 of the bonding layer 316 remain between the pigment sections. The pigment sections 531 comprise the two partial layers 513, 514. The pigment sections 531 (after the separation) are detached from the intermediate substrate layer 315, 316 and further processed as pigments, in particular into a printing ink.

If the solvent used for detaching the pigment sections (e.g. water) is compatible with the binder of the printing ink, the dispersion can also be added to a printing ink immediately. Where applicable, excess solvent can be drawn off by means of a vacuum mixer. In another variant, the pigments 1 are dried by means of a freeze dryer (solvent drawn off) and the dry pigments are mixed into a printing ink.

Figure 7A:
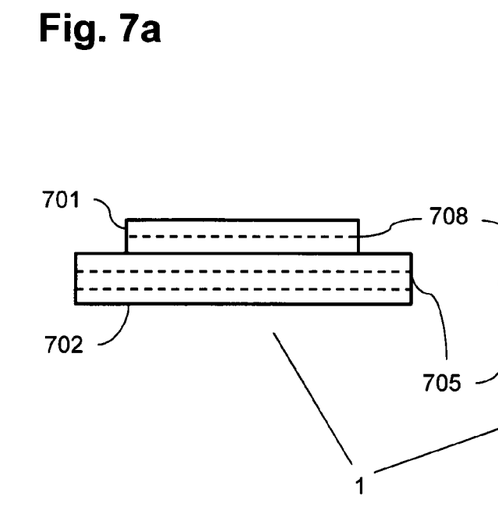
FIG. 7a, 7b a multilayer pigment of specified contour in top view and in cross-section.
Figure 7B:
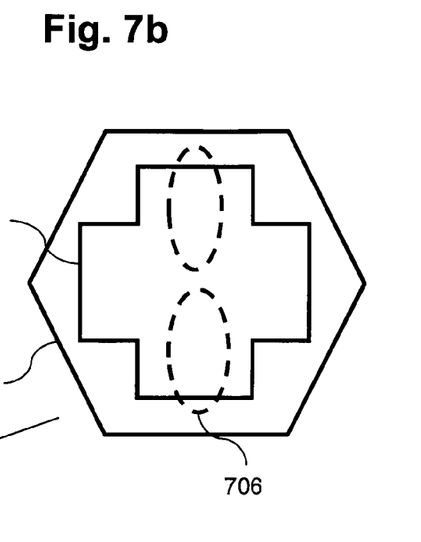

In FIGS. 7a and 7b, a pigment 1 is shown in cross-section and in top view. The pigment comprises—like the pigment shown in FIGS. 5 and 6—two pigment partial layers 701 and 702. Both pigment partial layers can in turn be formed by sublayers, such as for example a three-layer construction with absorber, dielectric and absorber (or reflector). The second pigment layer 702 has a breaking edge 705, which corresponds to the outer contour of pigment 1. The first pigment partial layer 701 is provided as additional information 708 having a contour on pigment 1 that is independent of the outer contour. Only in FIG. 7b it is indicated that pigment 1 may also have—for example two—openings 706.

In the following, variants of adhesion-determining pre-structurings are discussed that can be used analogously to the two variants represented in FIGS. 5 and 6. The structured adhesion-determining layer can be designed as an adhesive layer or as an anti-adhesive layer. It can be applied over the full area and removed in sections by means of laser irradiation, in particular either in accordance with the pigment sections or with the residual sections. Alternatively, the adhesion-determining layer is applied in sections by means of printing, i.e. only in the corresponding (pigment or residual) sections. The adhesion-determining layer may be formed by a lacquer which as an embossing lacquer preferably comprises an "optical" embossing which generates additional information in the pigment.

In another optional variant, a structured print, respectively in pigment shape, i.e. in the later pigment sections, is applied onto an (untreated) layer 516 that does not adhere well. In a second process step, the substrate layer printed in a structured manner is pre-treated by means of a pretreatment plant (plasma, open-air plasma, flame pretreatment or corona pretreatment plant). The non-adhesive layer 516 is converted into an adhesive layer by the pretreatment. The previously printed sections in pigment shape here serve as a template for the pre-treatment. Accordingly, there arise adherent sections 517 on which the residual sections 512 of the pigment layer remain adhered upon separation, while the pigment sections 511 upon separation detach from the layer 516 which still does not adhere well.

The adhesion-determining layer preferably has a thickness of at least 1 μm. Thus—analogous to the relief structure—predetermined breaking points are generated in the pigment layer created thereon, which for example has a thickness of 30 nm to 4 μm. It is also possible to apply an etching or washing ink by means of a printing method in order to structure the adhesion-determining layer. Rather only theoretically, it would be conceivable to structure the pigment layer directly by means of the washing or etching ink. However, the present method unfurls the most important advantages with still unstructured pigment layers.

Another production method for pigments with narrow size distribution could be effected by means of crack template. A crack template here means a layer on a carrier foil (e.g. PET) that has a network of continuous cracks so that the entire layer ultimately consists of individual islands. This crack template is metallized, at the island edges the metallization tearing off due to the height difference and the island size thus determining the pigment size. Ideally, the pigment layer is structured by the crack formation. The present, more relevant case is that the crack formation does not lead to a complete separation of the pigment layers.

In order to obtain the pigments, the crack template is either detachable from the foil (the crack template detaches from the foil but remains connected to the other pigment layers), or the crack template itself is water-soluble or soluble in another solvent so that it dissolves and releases the pigment—in the present case after the separation of the substrates.

Thus, two pigment types can be produced:
pigments consisting of a first pigment partial layer, such as for example a vapor-deposited metallization, and of the crack-forming layer; or
pigments that consist only of the pigment layer, such as a vapor-deposited metal layer (without a crack-forming layer).

The crack-forming layer may contribute to the stability of the pigments or the crack-forming material may possess functional properties (e.g. fluorescent dyes or magnetic particles).

Different possibilities are known to produce the crack template.

In a first implementation, a dispersion applied over the full area of a carrier foil forms at a sufficiently high minimum film formation temperature (MFT>50° C.) cracks during physical drying. The dispersion consists of particles dispersed in water and of organic-polymer nature (e.g. based on polyacrylates, polystyrenes, etc.) or inorganic nature (e.g. $SiO_2$, $TiO_2$, $Al_2O_3$, etc.) or mixtures thereof. To ensure solubility of the crack template in water, water-soluble compounds can be added. In another embodiment, a brittle UV lacquer with high shrinkage is applied all-over onto a carrier foil. During radiation curing, cracks form throughout due to shrinkage. This crack template can be further metallized to obtain the pigments. Ideally, the UV lacquer is designed such that it detaches by itself in water (water-soluble UV lacquers). For water-insoluble UV lacquers, a water-soluble intermediate layer is conceivable for detaching the pigments from the starting foil in water. A counter laminating foil with glue detaches the pigments from the carrier foil, the glue being subsequently dissolved and thus releasing the pigments.

The control of crack formation is decisive for the size distribution and shape of the pigments and depends on the chosen production method of the crack template. In the case of physically drying dispersions, adjusting the island size (=pigment size) is effected via the known parameters such as minimum film formation temperature, layer thickness, particle size, additives or drying conditions. In addition, it is known that the first generation of cracks tears perpendicularly from the edge of the printed image inwards, whereupon the second generation of cracks now arises parallel to the edge of the printed image and thus between the first generation of cracks. The ladder-like crack template resulting therefrom leads to rectangular islands or pigments. However, this effect decreases with increasing distance from the edge of the printed image. If only rectangular islands are desired, the foil is printed in stripes. Hexagonal islands and thus pigments are also possible.

For crack templates based on UV lacquers, a predetermined breaking point can be introduced during radiation curing by means of suitable structures on an embossing tool. The embossing tool presses e.g. two notches into or through the UV lacquer (cf. nanoimprinting), whereby after radiation curing a crack is initiated at the shortest distance between the two notches due to the shrinkage. By a certain arrangement of the notches the cracks can now be controlled in targeted fashion in lines and gratings. Of course, by this method there can also be produced hexagonal pigments very easily by the notches generating cracks at angles of 120° to each other, similar to a three-pointed star. Due to the variety of the arrangement of notches to each other and the type of the notches themselves, there is given a variety of shapes for the islands and therefore pigments.

Also pigment sections (or islands) created with the aid of a crack template can be detached from the starting substrate and preferably structured at the same time, according to the methods described in FIG. 3, 4, 5, 6 or 8.

The invention claimed is:
1. A method for producing pigments having a specified contour, the method comprising the steps of:
creating a pigment layer on a starting substrate;
providing an intermediate substrate to the pigment layer, such that the pigment layer adheres at least in sections to the intermediate substrate;
separating the intermediate substrate from the starting substrate;
structuring the pigment layer into a plurality of the pigments; and
detaching the plurality of pigments from at least one of the intermediate substrate and the starting substrate.

2. The method according to claim 1, wherein for the step of detaching and/or structuring the pigments are protected against breaking of the pigments by the contact with the intermediate substrate.

3. The method according to claim 1, wherein as the specified contour the pigments have a specified outer contour and/or a specified internal contour.

4. The method according to claim 1, wherein the pigment layer is structured into the plurality of the pigments by the step of separating the intermediate substrate and the starting substrate.

5. The method according to claim 1, wherein the pigments are detached by the step of separating the intermediate substrate from the starting substrate.

6. The method according to claim 1, wherein after separation of the intermediate substrate from the starting substrate the plurality of the pigments are present on the starting substrate and are subsequently detached from the starting substrate.

7. The method according to claim 1, wherein the pigment layer is structured prior to the step of separation.

8. The method according to claim 1, wherein in the starting substrate and/or the intermediate substrate a relief structure is created which specifies the specified contour of the pigments.

9. The method according to claim 8, wherein the relief structure is effected by embossing a curable, by means of UV light, embossing layer of the starting substrate and/or of the intermediate substrate.

10. The method according to claim 1, wherein an adhesion-determining structure is created on the pigment layer, the starting substrate and/or the intermediate substrate, which specifies the specified contour of the pigments.

11. The method according to claim 1, wherein the pigments contain contains a motif arranged in exact register to the specified contour of the pigments and/or has a contour which is independent of the specified contour.

12. The method according to claim 11, wherein in the step of creating the relief structure the motif is at least partially co-created, as an optically variable embossed structure;
wherein in the starting substrate and/or the intermediate substrate a relief structure is created which specifies the specified contour of the pigments.

13. The method according to claim 12, wherein the relief structure is effected by embossing a curable, by means of UV light, embossing layer of the starting substrate and/or of the intermediate substrate.

14. The method according to claim 1, wherein the pigment layer comprises at least one continuous partial layer and an additional, non-continuous partial layer.

15. The method according to claim 1, wherein the pigment layer is created on a cured lacquer layer of the starting substrate, which is arranged on a foil layer of the starting substrate; and/or
adheres to a lacquer layer of the intermediate substrate, which is arranged on a foil layer of the intermediate substrate.

* * * * *